United States Patent
Uchino

(10) Patent No.: US 12,126,164 B2
(45) Date of Patent: Oct. 22, 2024

(54) POWER-SUPPLY CONTROL DEVICE, BLOWING METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takeo Uchino, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 170 days.

(21) Appl. No.: 17/998,305

(22) PCT Filed: Apr. 26, 2021

(86) PCT No.: PCT/JP2021/016654
§ 371 (c)(1),
(2) Date: Nov. 9, 2022

(87) PCT Pub. No.: WO2021/230065
PCT Pub. Date: Nov. 18, 2021

(65) Prior Publication Data
US 2023/0223747 A1   Jul. 13, 2023

(30) Foreign Application Priority Data
May 14, 2020   (JP) .................... 2020-085297

(51) Int. Cl.
*H02H 7/20*   (2006.01)
*B60R 16/033*   (2006.01)

(52) U.S. Cl.
CPC ............. *H02H 7/20* (2013.01); *B60R 16/033* (2013.01)

(58) Field of Classification Search
CPC ........ B60R 16/02; B60R 16/033; H02H 7/20; H02H 3/087
(Continued)

(56) References Cited

U.S. PATENT DOCUMENTS

2016/0377044 A1* 12/2016 Toda ..................... F02P 19/027
219/497
2018/0351213 A1* 12/2018 Sugisawa ............. H01M 10/48

FOREIGN PATENT DOCUMENTS

| JP | 2001-095140 A | 4/2001 | |
|---|---|---|---|
| JP | 2015-196453 A | 11/2015 | |
| WO | WO-2015150894 A1 * | 10/2015 | ............ B60L 1/006 |

OTHER PUBLICATIONS

International Search Report, Application No. PCT/JP2021/016654, mailed Jul. 6, 2021. ISA/Japan Patent Office.

* cited by examiner

*Primary Examiner* — Kevin J Comber
(74) *Attorney, Agent, or Firm* — Honigman LLP

(57) ABSTRACT

In a power-supply control device, power supply to loads is controlled by driving circuits separately switching on or off FETs, respectively. In a state in which the connection destination of a fuse element is the FET, a microcomputer provides an instruction to switch the FET off. Then, the microcomputer determines whether or not a current is flowing through the FET. Upon determining that a current is flowing through the FET, the microcomputer switches the connection destination of the fuse element to the FETs, and provides an instruction to switch the FET on.

15 Claims, 8 Drawing Sheets

(58) Field of Classification Search
USPC .......................................................... 361/93.1
See application file for complete search history.

Operation Signal
Stop Signal

LEGEND
A= Microcomputer

LEGEND
A= Microcomputer

POWER-SUPPLY CONTROL DEVICE, BLOWING METHOD, AND COMPUTER PROGRAM

CROSS-REFERENCE TO RELATED APPLICATIONS

This application is the U.S. national stage of PCT/JP2021/016654 filed on Apr. 26, 2021, which claims priority of Japanese Patent Application No. JP 2020-085297 filed on May 14, 2020, the contents of which are incorporated herein.

TECHNICAL FIELD

The present disclosure relates to a power-supply control device, a blowing method, and a computer program.

BACKGROUND

In JP 2001-95140A, a vehicle power-supply control device that controls power supply from a power source to loads is installed. In this power-supply control device, a field effect transistor (FET) that functions as a switch is arranged in a path of a current that flows from the power source to the loads. Power supply to the loads is controlled by switching the FET on or off.

There is a conventional power-supply control device in which a fuse element, such as a fuse for example, is arranged upstream of an FET in a current path of a current that flows from a power source to a load through the FET. In the conventional power-supply control device, the fuse element is blown and current flow stops if the current flowing through the fuse element and the FET becomes greater than or equal to a predetermined current. Thus, the flow of an overcurrent through the FET is prevented.

Suppose that an ON failure, which is a failure in which a current flows through the FET even through an instruction to switch the FET off has been provided, occurs in the conventional power-supply control device. The current flowing through the FET, in which an ON failure has occurred, is smaller than or equal to the current flowing through the FET when the FET is on. Accordingly, the fuse element is not blown even if an ON failure occurs in the FET. This gives rise to the following problem: a current keeps flowing through the FET even though an instruction to switch the FET off has been provided.

If the FET, in which an ON failure has occurred, has a high resistance value, the FET generates a large amount of heat and may be heated to an abnormal temperature. If the resistance value of the FET, in which an ON failure has occurred, is low enough, a large current may flow through the FET and the load may keep operating.

In view of this, an object is to provide a power-supply control device, a blowing method, and a computer program in which a fuse element is blown if an ON failure occurs in an FET.

SUMMARY

A power-supply control device according to one aspect of the present disclosure is a power-supply control device that controls power supply by separately switching on or off a first FET and a second FET that are respectively connected to a first load and a second load, the power-supply control device including: a fuse element that is blown if a current that is greater than or equal to a predetermined current flows therethrough; a switching unit that switches the connection destination of a downstream-side end of the fuse element; and a processing unit that executes processing, wherein the processing unit: in a state in which the connection destination of the fuse element is the first FET, provides an instruction to switch the first FET off after providing the instruction to switch the first FET off, determines whether or not a current is flowing through the first FET; upon determining that a current is flowing through the first FET, instructs the switching unit to switch the connection destination of the fuse element to the first and second FETs; and provides an instruction to switch the second FET on.

In a blowing method according to one aspect of the present disclosure, a computer executes: a step of, in a state in which the connection destination of a downstream-side end of a fuse element that is blown if a current that is greater than or equal to a predetermined current flows therethrough is a first FET that is connected to a first load, providing an instruction to switch the first FET off, a step of, after providing the instruction to switch the first FET off, determining whether or not a current is flowing through the first FET; a step of, upon determining that a current is flowing through the first FET, instructing a switching unit that switches the connection destination of the downstream-side end of the fuse element to switch the connection destination of the fuse element to the first FET and a second FET that is connected to a second load; and a step of providing an instruction to switch the second FET on.

A computer program according to one aspect of the present disclosure causes a computer to executes: a step of, in a state in which the connection destination of a downstream-side end of a fuse element that is blown if a current that is greater than or equal to a predetermined current flows therethrough is a first FET that is connected to a first load, providing an instruction to switch the first FET off, a step of, after providing the instruction to switch the first FET off, determining whether or not a current is flowing through the first FET; a step of, upon determining that a current is flowing through the first FET, instructing a switching unit that switches the connection destination of the downstream-side end of the fuse element to switch the connection destination of the fuse element to the first FET and a second FET that is connected to a second load; and a step of providing an instruction to switch the second FET on.

Note that, not only can the present disclosure be realized as a power-supply control device including such a characteristic processing unit, but the present disclosure can also be realized as a blowing method including such characteristic processing as steps or as a computer program for causing a computer to execute such steps. Furthermore, the present disclosure can also be realized as a semiconductor integrated circuit that partially or entirely realizes the power-supply control device, or as a power system including the power-supply control device.

Advantageous Effects of the Disclosure

According to the present disclosure, a fuse element is blown if an ON failure occurs in an FET.

DETAILED DESCRIPTION OF PREFERRED EMBODIMENTS

Figure 1:
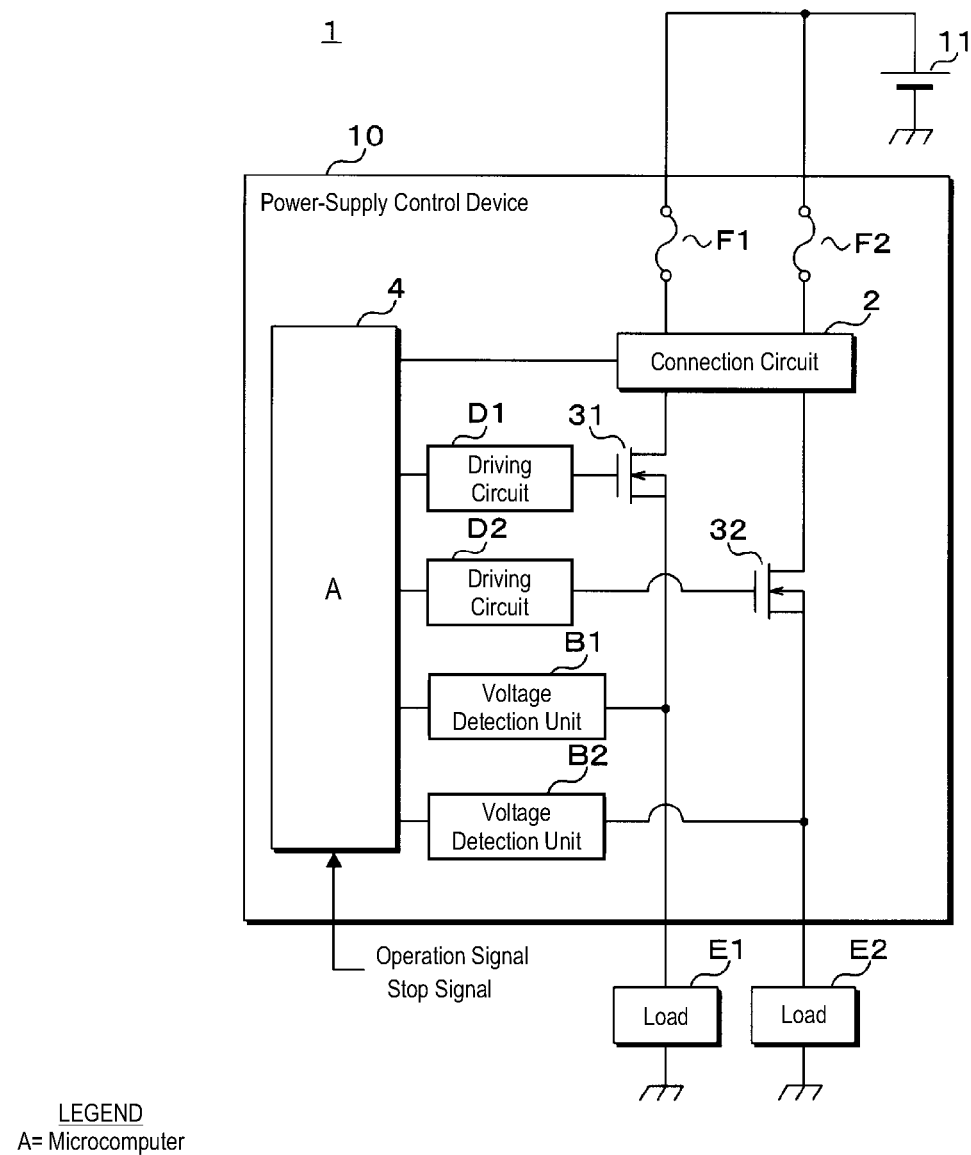
FIG. 1 is a block diagram illustrating a configuration of a main part of a power system in embodiment 1.

First, aspects of the present disclosure will be listed and described. The embodiments described below may at least be partially combined as appropriate.

A power-supply control device according to one aspect of the present disclosure is a power-supply control device that controls power supply by separately switching on or off a first FET and a second FET that are respectively connected to a first load and a second load, the power-supply control device including: a fuse element that is blown if a current that is greater than or equal to a predetermined current flows therethrough; a switching unit that switches the connection destination of a downstream-side end of the fuse element; and a processing unit that executes processing, wherein the processing unit: in a state in which the connection destination of the fuse element is the first FET, provides an instruction to switch the first FET off after providing the instruction to switch the first FET off, determines whether or not a current is flowing through the first FET; upon determining that a current is flowing through the first FET, instructs the switching unit to switch the connection destination of the fuse element to the first and second FETs; and provides an instruction to switch the second FET on.

The power-supply control device according to one aspect of the present disclosure further includes a second fuse element that is blown if a current that is greater than or equal to a second predetermined current flows therethrough, wherein the switching unit separately switches the connection destinations of downstream-side ends of the fuse element and the second fuse element, and the processing unit provides the instruction to switch the first FET off in a state in which the connection destinations of the fuse element and the second fuse element are the first FET and the second FET, respectively.

In the power-supply control device according to one aspect of the present disclosure, the processing unit: after instructing the switching unit to switch the connection destination of the fuse element to the first and second FETs, determines whether or not the fuse element has been blown; and upon determining that the fuse element has been blown, instructs the switching unit to switch the connection destination of the second fuse element to the second FET.

In the power-supply control device according to one aspect of the present disclosure, the first load is arranged downstream of the first FET in a first current path of a current that flows through the first FET, the second load is arranged downstream of the second FET in a second current path of a current that flows through the second FET, and after instructing the switching unit to switch the connection destination of the fuse element to the first and second FETs, the processing unit determines whether or not the fuse element has been blown based on a voltage of a downstream-side end of the first FET or the second FET.

In the power-supply control device according to one aspect of the present disclosure, the first load is arranged downstream of the first FET in a current path of a current that flows through the first FET, and, after providing the instruction to switch the first FET off, the processing unit determines whether or not a current is flowing through the first FET based on a voltage of a downstream-side end of the first FET.

In the power-supply control device according to one aspect of the present disclosure, two or more second FETs are provided, and the processing unit: upon determining that a current is flowing through the first FET, instructs the switching unit to switch the connection destination of the fuse element to the first FET and an off-FET that is a second FET that is off among the plurality of second FETs; and provides an instruction to switch on the off-FET connected to the fuse element.

In a blowing method according to one aspect of the present disclosure, a computer executes: a step of, in a state in which the connection destination of a downstream-side end of a fuse element that is blown if a current that is greater than or equal to a predetermined current flows therethrough is a first FET that is connected to a first load, providing an instruction to switch the first FET off a step of, after providing the instruction to switch the first FET off, determining whether or not a current is flowing through the first FET; a step of, upon determining that a current is flowing through the first FET, instructing a switching unit that switches the connection destination of the downstream-side end of the fuse element to switch the connection destination of the fuse element to the first FET and a second FET that is connected to a second load; and a step of providing an instruction to switch the second FET on.

A computer program according to one aspect of the present disclosure causes a computer to executes: a step of, in a state in which the connection destination of a downstream-side end of a fuse element that is blown if a current that is greater than or equal to a predetermined current flows therethrough is a first FET that is connected to a first load, providing an instruction to switch the first FET off a step of, after providing the instruction to switch the first FET off, determining whether or not a current is flowing through the first FET; a step of, upon determining that a current is flowing through the first FET, instructing a switching unit that switches the connection destination of the downstream-side end of the fuse element to switch the connection destination of the fuse element to the first FET and a second FET that is connected to a second load; and a step of providing an instruction to switch the second FET on.

In the power-supply control device, the blowing method, and the computer program according to the above-described aspect, a current flows through the fuse element and the first FET in this order if the connection destination of the fuse element is the first FET. If a current is flowing through the first FET even though an instruction to switch the first FET off has been provided, the fuse element is connected to the first and second FETs, and the second FET is switched on. Accordingly, the current flowing through the fuse element increases and becomes greater than or equal to the predetermined current, and the fuse element is blown.

In the power-supply control device according to the above-described aspect, in a normal state, a current flows through the fuse element, the first FET, and the first load in this order, and a current flows through the second fuse element, the second FET, and the second load in this order. If an ON failure occurs in the first FET, the second FET is connected to the fuse element.

In the power-supply control device according to the above-described aspect, in a case in which the first and second FETs have been connected to the fuse element, the connection destination of the second fuse element is returned to the second FET after the fuse element has been blown. Thus, power can be supplied to the second load via the second fuse element and the second FET once again.

In the power-supply control device according to the above-described aspect, downstream-side ends of the first and second loads are grounded, for example. In this case, when the fuse element has been blown, no current flows through the first FET and the first load, and thus the voltage of the downstream-side end of the first FET is substantially 0 V. In the same case, when the fuse element has not been blown, a current flows through the first FET and the first load, and a voltage drop occurs at the first load. Thus, the voltage of the downstream-side end of the first FET is higher than 0 V.

Similarly, in a case in which the downstream-side ends of the first and second loads are grounded, when the fuse element has been blown, no current flows through the second FET and the second load, and thus the voltage of the downstream-side end of the second FET is substantially 0 V. In the same case, when the fuse element has not been blown, a current flows through the second FET and the second load, and a voltage drop occurs at the second load. Thus, the voltage of the downstream-side end of the second FET is higher than 0 V. Accordingly, the determination of whether or not the fuse element has been blown can be performed based on the voltage of the downstream-side end of the first FET or the second FET.

In the power-supply control device according to the above-described aspect, the downstream-side ends of the first and second loads are grounded, for example. In this case, when no current is flowing through the first FET, no current is flowing through the first load, and thus the voltage of the downstream-side end of the first FET is substantially 0 V. In the same case, when a current is flowing through the first FET, a current flows through the first load, and a voltage drop occurs at the first load. Thus, the voltage of the downstream-side end of the first FET is higher than 0 V. Accordingly, the determination of whether or not a current is flowing through the first FET can be performed based on the voltage of the downstream-side end of the first FET.

In the power-supply control device according to the above-described aspect, in a case in which the fuse element is to be blown, an off-FET, which is a second FET that is off among the plurality of second FETs, is connected to the fuse element and switched on. Thus, unless all of the second FETs are off, power supply to operating second loads is not interrupted.

Specific examples of the power-supply control device according to the present disclosure will be described below with reference to the drawings. Note that the present disclosure is not limited to these examples, and is intended to include all modifications that are indicated by the claims and are within the meaning and scope of equivalents of the claims.

Embodiment 1

Configuration of Power System

FIG. 1 is a block diagram illustrating a configuration of a main part of a power system 1 in embodiment 1. The power system 1 is installed in a vehicle, and includes a power-supply control device 10, a DC power source 11, and two loadsa E1 and E2. For example, the DC power source 11 is a battery. The power-supply control device 10 is connected to the positive electrode of the DC power source 11, and one end of each of the loads E1 and E2. The negative electrode of the DC power source 11 and the other end of each of the loads E1 and E2 are grounded.

In the following, k represents a natural number that is 2 or less. The natural number k may be 1 or 2.

The load Ek is an electric device. The load Ek operates if power is supplied thereto. The load Ek stops operating if power supply thereto stops. Preferably, the load Ek is an electric device that does not interrupt vehicle driving, such as a headlamp, a room lamp, or an audio device.

Operation signals indicating a load to be operated out of the loads E1 and E2, and stop signals indicating a load whose operation is to be stopped out of the loads E1 and E2 are input to the power-supply control device 10. Upon input of an operation signal indicating the load Ek, the power-supply control device 10 electrically connects the DC power source 11 and the load Ek. Thus, the DC power source 11 supplies power to the load Ek, and the load Ek operates. Upon input of a stop signal indicating the load Ek, the power-supply control device 10 electrically disconnects the DC power source 11 and the load Ek. Thus, power supply to the load Ek stops, and the load Ek stops operating.

The power-supply control device 10 controls power supply to the loads E1 and E2 in such a manner.

Configuration of Power-Supply Control Device 10

The power-supply control device 10 includes a connection circuit 2, two N-channel FETs 31 and 32, a microcomputer 4, two voltage detection units B1 and B2, two driving circuits D1 and D2, and two fuse elements F1 and F2. These components may be installed on the same substrate.

The FET $3k$ functions as a semiconductor switch. As described above, k is a natural number that is 2 or less. In regard to the FET $3k$, if the FET $3k$ is on, the drain-source resistance value is low enough for a current to flow through the drain and the source. In regard to the FET $3k$, if the FET $3k$ is off, the drain-source resistance value is high enough to ensure that no current flows through the drain and the source.

One end of the fuse element Fk is connected to the positive electrode of the DC power source 11. The other end of the fuse element Fk is connected to the connection circuit 2. The connection circuit 2 is connected to the drain of the FET $3k$. The source of the FET $3k$ is connected to the one end of the load Ek. The gate of the FET $3k$ is connected to the driving circuit Dk. The source of the FET $3k$ is further connected to the voltage detection unit Bk. The connection circuit 2, the two voltage detection units B1 and B2, and the two driving circuits D1 and D2 are each connected to the microcomputer 4.

The connection circuit 2 connects the fuse element Fk to at least one of the two FETs 31 and 32. Normally, the connection circuit 2 connects the fuse elements F1 and F2 to the FETs 31 and 32, respectively. The connection destination of the fuse element Fk is switched by the microcomputer 4. Switching the connection destination of the fuse element Fk is equivalent to switching the connection destination of the FET $3k$.

A current flows through the fuse element Fk from the positive electrode of the DC power source 11. The fuse element Fk is blown if a current that is greater than or equal to a reference current flows through the fuse element Fk. The two reference currents respectively corresponding to the fuse elements F1 and F2 may be the same or may be different from one another. The fuse element Fk is a fuse, fusible link, or the like.

In the FET 3k, if the voltage of the gate with reference to the potential of the source is higher than or equal to a predetermined ON voltage, the FET 3k is on. In the FET 3k, if the voltage of the gate with reference to the potential of the source is lower than a predetermined OFF voltage, the FET 3k is off. The ON voltage is higher than the OFF voltage. The OFF voltage is a positive voltage.

The microcomputer 4 outputs a high-level voltage or a low-level voltage to the driving circuit Dk. If the microcomputer 4 switches the voltage output to the driving circuit Dk from the low-level voltage to the high-level voltage, the driving circuit Dk increases the voltage of the gate of the FET 3k with reference to the ground potential. Thus, in the FET 3k, the voltage of the gate with reference to the potential of the source becomes higher than or equal to the ON voltage, and the FET 3k switches on.

If the FET 3k switches on, the DC power source 11 and the load Ek are electrically connected, and power is supplied from the DC power source 11 to the load Ek through the FET 3k. Here, a current flows through the FET 3k and the load Ek in this order. Thus, the load Ek is arranged downstream of the FET 3k in a current path of a current that flows through the FET 3k. Because a current flows through the drain and the source in this order in the FET 3k, the drain and the source of the FET 3k are an upstream-side end and a downstream-side end, respectively.

If the microcomputer 4 switches the voltage output to the driving circuit Dk from the high-level voltage to the low-level voltage, the driving circuit Dk decreases the voltage of the gate of the FET 3k with reference to the ground potential. Thus, in the FET 3k, the voltage of the gate with reference to the potential of the source becomes lower than the OFF voltage, and the FET 3k switches off. If the FET 3k switches off, the DC power source 11 and the load Ek are electrically disconnected, current flow through the FET 3k stops, and power supply to the load Ek through the FET 3k stops.

As described above, the driving circuits D1 and D2 respectively switch the FETs 31 and 32 on or off in accordance with a voltage that is input from the microcomputer 4. Thus, power supply to each of the loads E1 and E2 is controlled.

In the following, the voltage of the source of the FET 3k with reference to the ground potential is referred to as a source voltage. The voltage detection unit Bk detects the source voltage of the FET 3k, and outputs analog voltage information indicating the detected source voltage to the microcomputer 4. For example, the analog voltage information is an analog value of a voltage indicating the source voltage. For example, the voltage indicating the source voltage is a voltage obtained by two unillustrated resistors dividing the source voltage.

Operation signals and stop signals are input to the microcomputer 4. Upon input of an operation signal indicating the load Ek, the microcomputer 4 switches the voltage output to the driving circuit Dk from the low-level voltage to the high-level voltage. Thus, the driving circuit Dk switches the FET 3k on, and power is supplied to the load Ek. Upon input of a stop signal indicating the load Ek, the microcomputer 4 switches the voltage output to the driving circuit Dk from the high-level voltage to the low-level voltage. Thus, the driving circuit Dk switches the FET 3k off, and power supply to the load Ek stops.

As described above, the fuse elements F1 and F2 are normally connected to the FETs 31 and 32, respectively. Accordingly, if the FET 3k is on, a current normally flows from the positive electrode of the DC power source 11 to the fuse element Fk, the FET 3k, the load Ek, and the negative electrode of the DC power source 11 in this order.

Upon switching the voltage output to the driving circuit Dk from the high-level voltage to the low-level voltage in a state in which the connection destination of the fuse element Fk is the FET 3k, the microcomputer 4 determines whether or not an ON failure has occurred in the FET 3k based on the source voltage indicated by the voltage information input from the voltage detection unit Bk. An ON failure is a failure in which a current flows through the FET 3k even though the voltage output by the driving circuit Dk is the low-level voltage.

Upon determining that an ON failure has occurred in the FET 3k, the microcomputer 4 switches the connection destination of the fuse element Fk from the FET 3k to the FETs 31 and 32. Then, the microcomputer 4 instructs the driving circuit other than the driving circuit Dk to switch the FET other than the FET 3k on. Thus, the current flowing through the fuse element Fk becomes greater than or equal to the reference current, and the fuse element Fk is blown.

The microcomputer 4 determines whether or not the fuse element Fk has been blown based on the source voltage indicated by the voltage information input from the voltage detection unit B1 or the voltage detection unit B2. Upon determining that the fuse element Fk has been blown, the microcomputer 4 instructs the driving circuit to return the FET other than the FET 3k to its previous state. Furthermore, the microcomputer 4 returns the connection destination of the FET other than the FET 3k to the previously-connected fuse element.

Configuration of Connection Circuit 2

Figure 2:
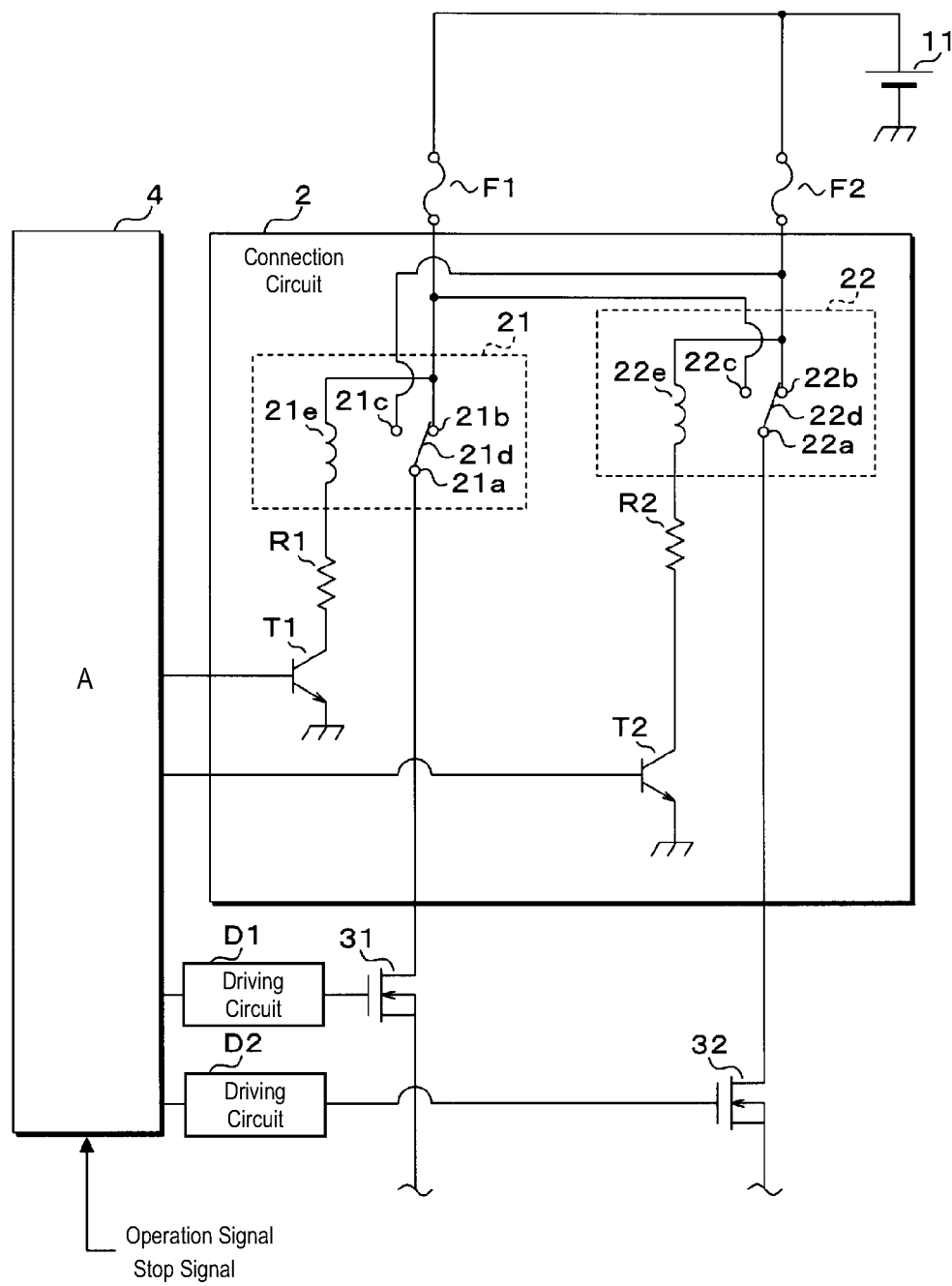
FIG. 2 is a circuit diagram of a connection circuit.

FIG. 2 is a circuit diagram of the connection circuit 2. The connection circuit 2 includes relays 21 and 22, resistors R1 and R2, and transistors T1 and T2. The relay 21 includes a COM terminal 21a, an NC terminal 21b, an NO terminal 21c, a rod-shaped conductor 21d, and a coil 21e. The relay 22 includes a COM terminal 22a, an NC terminal 22b, an NO terminal 22c, a rod-shaped conductor 22d, and a coil 22e. In regard to the relay 2k, an end portion of the conductor 2kd is connected to the COM terminal 2ka. The conductor 2kd can rotate in a state in which the COM terminal 2ka is the pivot point. As described above, k is a natural number that is 2 or less.

The transistor Tk is an NPN bipolar transistor. The transistor Tk functions as a switch. In regard to the transistor Tk, if the transistor Tk is on, the collector-emitter resistance value is low enough for a current to flow through the collector and the emitter. In regard to the transistor Tk, if the transistor Tk is off, the collector-emitter resistance value is high enough to ensure that no current flows through the collector and the emitter.

The downstream-side end of the fuse element F1 is connected to the NC terminal 21b of the relay 21 and the NO terminal 22c of the relay 22. The downstream-side end of the fuse element F2 is connected to the NO terminal 21c of the relay 21 and the NC terminal 22b of the relay 22. The COM terminal 2ka of the relay 2k is connected to the FET 3k. In regard to the relay 2k, the NC terminal 2kb is further connected to one end of the coil 2ke. The other end of the coil 2ke is connected to one end of the resistor Rk. The other end of the resistor Rk is connected to the collector of the transistor Tk. The emitter of the transistor Tk is grounded. The base of the transistor Tk is connected to the microcomputer 4.

In regard to the transistor Tk, if the voltage of the base with reference to the potential of the emitter is higher than or equal to a predetermined voltage, the transistor Tk is on.

In regard to the transistor Tk, if the voltage of the base with reference to the potential of the emitter is lower than the predetermined voltage, the transistor Tk is off. The predetermined voltage is a positive voltage.

In the following, the voltage of the base of the transistor Tk with reference to the ground potential is referred to as a base voltage. The microcomputer 4 switches the transistor Tk on or off by adjusting the base voltage of the transistor Tk. Upon switching the transistor Tk on, the microcomputer 4 increases the base voltage of the transistor Tk. Thus, in the transistor Tk, the voltage of the base with reference to the potential of the emitter becomes higher than or equal to the predetermined voltage, and the transistor Tk switches on.

Upon switching the transistor Tk off, the microcomputer 4 decreases the base voltage of the transistor Tk. Thus, in the transistor Tk, the voltage of the base with reference to the potential of the emitter becomes lower than the predetermined voltage, and the transistor Tk switches off.

If the transistor Tk is on, a current flows from the positive electrode of the DC power source 11 to the fuse element Fk, the coil 2ke, the resistor Rk, the transistor Tk, and the negative electrode of the DC power source 11 in this order. If a current flows through the coil 2ke, the coil 2ke acts as a magnet.

The conductor 2kd of the relay 2k is a magnetic body. The conductor 2kd is biased toward the NC terminal 2kb by an unillustrated elastic body such as a spring, for example. Due to this, if no current is flowing through the coil 2ke, the coil 2ke does not function as a magnet, and thus the conductor 2kd is in contact with the NC terminal 2kb, and the COM terminal 2ka is connected to the NC terminal 2kb. In this situation, the connection destination of the FET 3k is the fuse element Fk.

If a current flows through the coil 2ke, the coil 2ke attracts the conductor 2kd toward the NO terminal 2kc and the conductor 2kd comes into contact with the NO terminal 2kc, and the COM terminal 2ka is connected to the NO terminal 2kc. While a current is flowing through the coil 2ke, the COM terminal 2ka is connected to the NO terminal 2kc. In this situation, the connection destination of the FET 3k is the fuse element other than the fuse element Fk.

The microcomputer 4 switches the connection destination of the fuse element Fk by separately switching the two transistors T1 and T2 on or off. Normally, the transistors T1 and T2 are off. In this situation, the fuse elements F1 and F2 are respectively connected to the FETs 31 and 32. If the transistors T1 and T2 are off and on, respectively, the connection destination of the fuse element F1 is the FETs 31 and 32, and the downstream-side end of the fuse element F2 is opened. If the transistors T1 and T2 are on and off, respectively, the connection destination of the fuse element F2 is the FETs 31 and 32, and the downstream-side end of the fuse element F1 is opened.

The microcomputer 4 determines whether or not an ON failure has occurred in the FET 3k in a state in which the transistors T1 and T2 are off. Upon determining that an ON failure has occurred in the FET 31, the microcomputer 4 switches the connection destination of the fuse element F1 from the FET 31 to the FETs 31 and 32 by switching the transistor T2 on. Thus, the current flowing through the fuse element F1 becomes greater than or equal to the reference current, and the fuse element F1 is blown. Upon determining that an ON failure has occurred in the FET 32, the microcomputer 4 switches the connection destination of the fuse element F2 from the FET 32 to the FETs 31 and 32 by switching the transistor T1 on. Thus, the current flowing through the fuse element F2 becomes greater than or equal to the reference current, and the fuse element F2 is blown.

Configuration of Microcomputer 4

Figure 3:
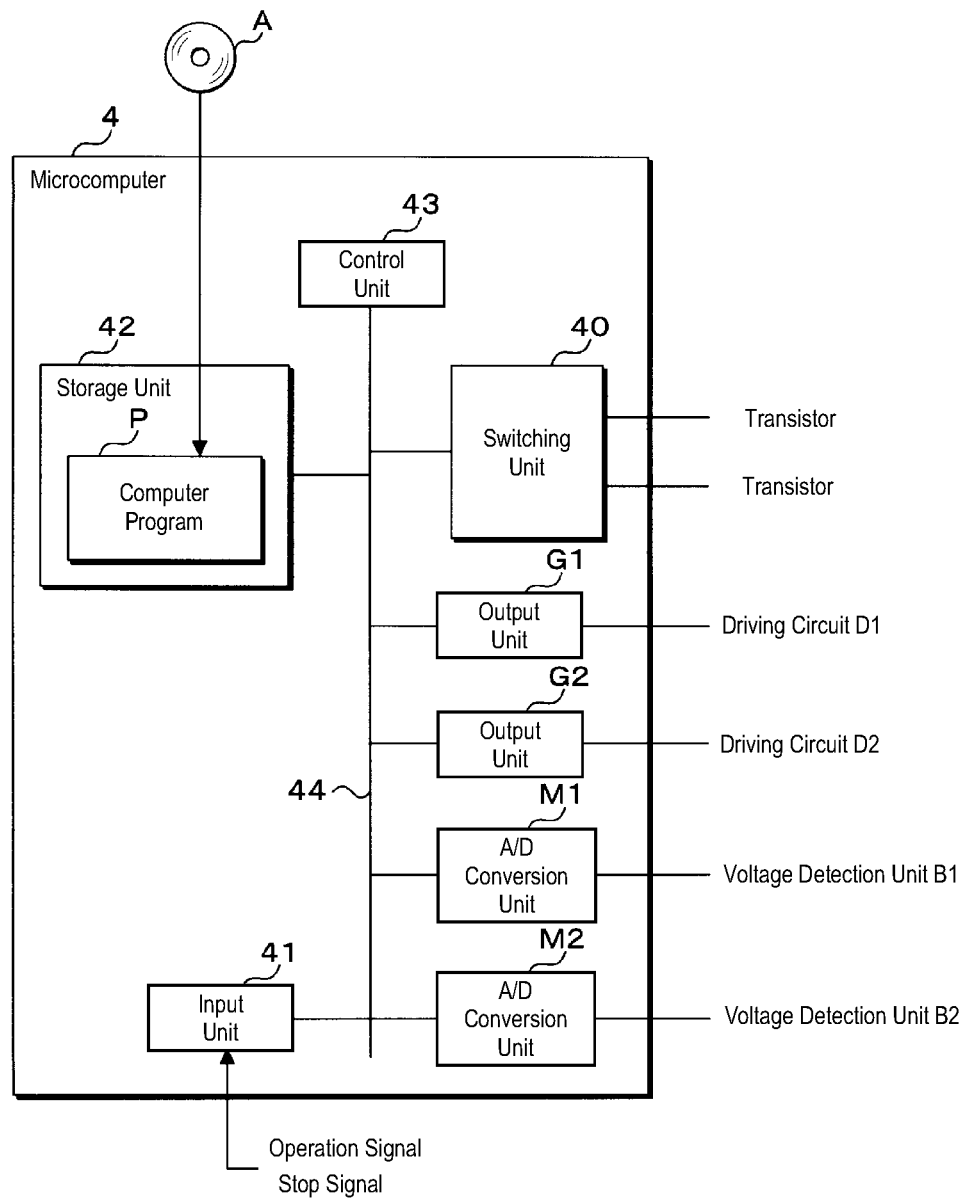
FIG. 3 is a block diagram illustrating a configuration of a main part of a microcomputer.

FIG. 3 is a block diagram illustrating a configuration of a main part of the microcomputer 4. The microcomputer 4 includes a switching unit 40, an input unit 41, a storage unit 42, a control unit 43, two output units G1 and G2, and two A/D conversion units M1 and M2. These units are connected to an internal bus 44. The switching unit 40 is further separately connected to the bases of the transistors T1 and T2 of the connection circuit 2. The output unit Gk is further connected to the driving circuit Dk. As described above, k is a natural number that is 2 or less. The A/D conversion unit Mk is further connected to the voltage detection unit Bk.

The switching unit 40 switches the transistor Tk on or off by adjusting the base voltage of the transistor Tk as described above. The switching unit 40 switches the connection destination of the downstream-side end of the fuse element Fk by separately switching the two transistors T1 and T2 on or off.

The control unit 43 instructs the switching unit 40 to switch the connection destination of the fuse element Fk to the FETs 31 and 32. Furthermore, the control unit 43 instructs the switching unit 40 to switch the connection destination of the fuse element Fk to the FET 3k. By following the instructions from the control unit 43, the switching unit 40 separately switches the two transistors T1 and T2 on or off.

Note that there is no problem as long as the transistors T1 and T2 each function as a switch. Thus, each of the transistors T1 and T2 is not limited to being an NPN bipolar transistor, and may be an N-channel FET, for example.

The output unit Gk outputs the low-level voltage or the high-level voltage to the driving circuit Dk. The control unit 43 instructs the output unit Gk to switch the FET 3k on or off. Upon being instructed to switch the FET 3k on, the output unit Gk switches the voltage output to the driving circuit Dk to the high-level voltage. Thus, the FET 3k switches on. Upon being instructed to switch the FET 3k off, the output unit Gk switches the voltage output to the driving circuit Dk to the low-level voltage. Thus, the FET 3k switches off.

The analog voltage information from the voltage detection unit Bk is input to the A/D conversion unit Mk. Upon receiving input of the analog voltage information, the A/D conversion unit Mk converts the input analog voltage information into digital voltage information. The control unit 43 acquires, from the A/D conversion unit Mk, the digital voltage information obtained by the A/D conversion unit Mk performing the conversion. The source voltage of the FET 3k indicated by the voltage information acquired by the control unit 43 substantially matches the source voltage at the time of acquisition.

Operation signals and stop signals are input to the input unit 41. Upon receiving input of an operation signal or a stop signal, the input unit 41 notifies the control unit 43 of the input signal.

The storage unit 42 is a non-volatile memory. A computer program P is stored in the storage unit 42. The control unit 43 includes a processing element that executes processing, such as a central processing unit (CPU) for example, and functions as the processing unit. By executing the computer program P, the processing element of the control unit 43 parallelly executes two power-supply control processes for controlling power supply to the loads E1 and E2, respectively, etc. In the power-supply control process for the load Ek, a blowing process of the fuse element Fk is executed. In the blowing process of the fuse element Fk, the control unit 43 determines whether or not an ON failure has occurred in the FET 3k. If the control unit 43 determines that an ON failure has occurred in the FET 3k, the fuse element Fk is blown.

Note that the computer program P may be stored in a storage medium A so that the computer program P can be read by the processing element of the control unit 43. In this case, the computer program P read from the storage medium A by an unillustrated reading device is written to the storage unit 42. The storage medium A is an optical disk, a flexible disk, a magnetic disk, a magneto-optical disk, a semiconductor memory, or the like. The optical disk is a compact disc (CD) read-only memory (ROM), a Digital Versatile Disc (DVD) ROM, a Blu-ray (registered trademark) Disc (BD), or the like. The magnetic disk is a hard disk, for example. Furthermore, the control program P may be downloaded from an unillustrated device that is connected an unillustrated communication network, and the downloaded computer program P may be written to the storage unit 42.

The number of processing elements included in the control unit 43 is not limited to one, and may be two or more. In this case, the plurality of processing elements may execute the two power-supply control processes, etc., in cooperation with one another in accordance with the computer program P.

Power-Supply Control Process for Load Ei

Figure 4:
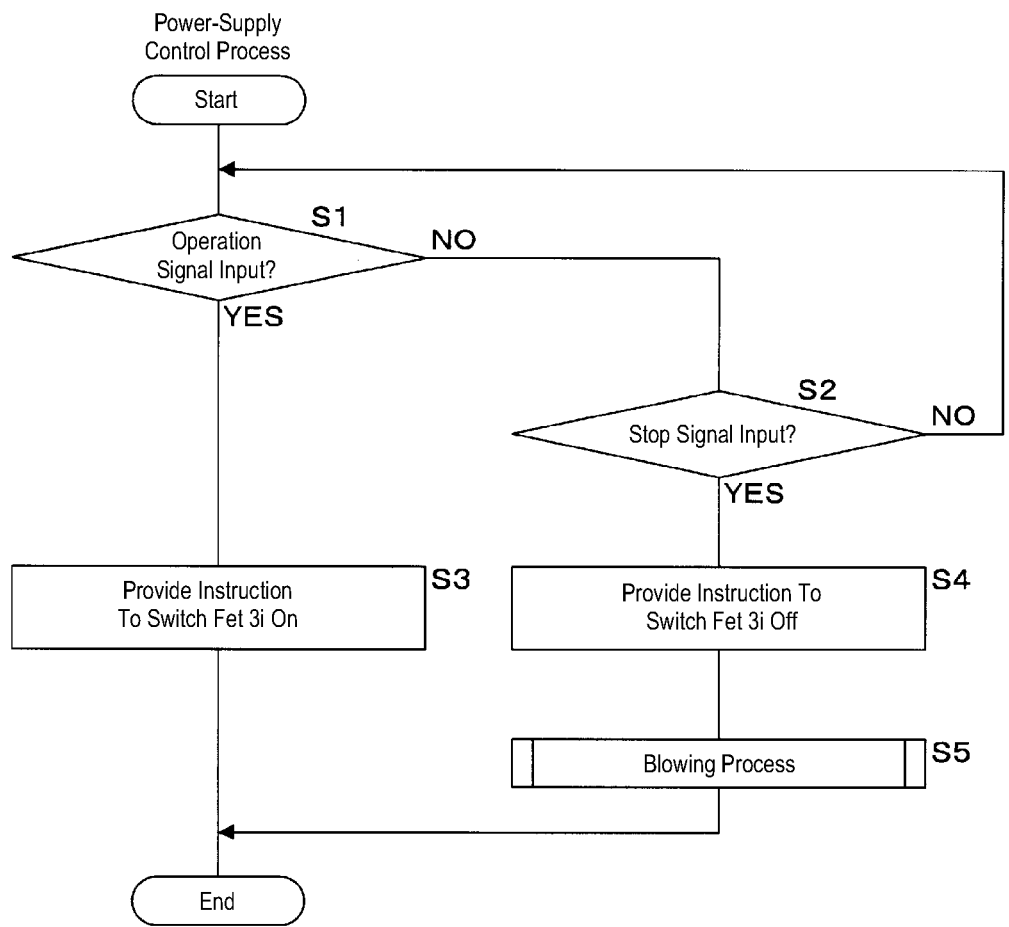
FIG. 4 is a flowchart illustrating procedures of a load power-supply control process.

FIG. 4 is a flowchart illustrating procedures of a power-supply control process for a load Ei. Here, i is a natural number that is 2 or less. Accordingly, the natural number i may be 1 or 2. j represents a natural number that is 2 or less and that is different from the natural number i. If the natural number i is 1, the natural number j is 2. If the natural number i is 2, the natural number j is 1.

The control unit 43 executes the power-supply control process for the load Ei in a state in which the fuse elements F1 and F2 are respectively connected to the FETs 31 and 32. In the power-supply control process for the load Ei, the control unit 43 first determines whether or not an operation signal indicating the load Ei has been input to the input unit 41 (step S1).

Upon determining that an operation signal indicating the load Ei has not been input (NO in step S1), the control unit 43 determines whether or not a stop signal indicating the load Ei has been input to the input unit 41 (step S2). Upon determining that a stop signal indicating the load Ei has not been input (NO in step S2), the control unit 43 executes step S1 again and waits until an operation signal or stop signal indicating the load Ei is input to the input unit 41.

Upon determining that an operation signal indicating the load Ei has been input (YES in step S1), the control unit 43 instructs the output unit Gi to switch the FET 3i on (step S3). Thus, the output unit Gi switches the voltage output to the driving circuit Di from the low-level voltage to the high-level voltage, and the driving circuit Di switches the FET 3i on.

Upon determining that a stop signal indicating the load Ei has been input (YES in step S2), the control unit 43 instructs the output unit Gi to switch the FET 3i off (step S4). If step S4 is executed while the power-supply control device 10 is in a normal state, the output unit Gi switches the voltage output to the driving circuit Di from the high-level voltage to the low-level voltage, and the driving circuit Di switches the FET 3i off. After executing step S4, the control unit 43 executes a blowing process of the fuse element Fi (step S5).

After executing either step S3 or S5, the control unit 43 terminates the power-supply control process for the load Ei.

After terminating the power-supply control process for the load Ei, the control unit 43 executes the power-supply control process for the load Ei again and waits until an operation signal or a stop signal indicating the load Ei is input.

Blowing Process of Fuse Element Fi

Figure 5:
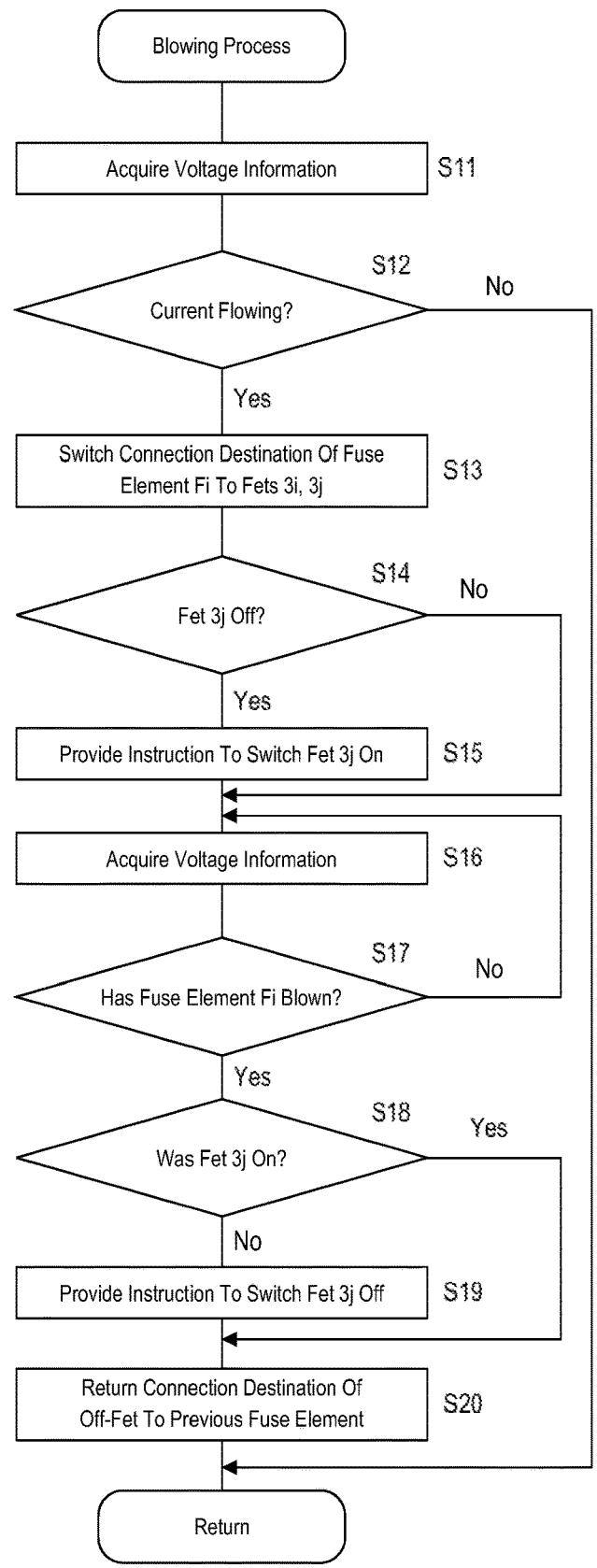
FIG. 5 is a flowchart illustrating procedures of a fuse-element blowing process.

FIG. 5 is a flowchart illustrating procedures of a blowing process of the fuse element Fi. The control unit 43 executes the blowing process of the fuse element Fi in a state in which the fuse elements Fi and Fj are respectively connected to the FETs 3i and 3j, and an instruction to switch the FET 3i off has been provided. As described above, if the natural number i is 1, the natural number j is 2. If the natural number i is 2, the natural number j is 1.

The FET 3i functions as the first FET. The FET 3j functions as the second FET. The load Ei functions as the first load. The load Ej functions as the second load. The fuse element Fj functions as the second fuse element. The reference current of the fuse element Fi corresponds to the predetermined current. The reference current of the fuse element Fj corresponds to the second predetermined current.

In the blowing process of the fuse element Fi, the control unit 43 first acquires voltage information from the A/D conversion unit Mi (step S11). The voltage information acquired in step S11 indicates the source voltage of the FET 3i. Next, the control unit 43 determines whether or not a current is flowing through the FET 3i based on the source voltage of the FET 3i indicated by the voltage information acquired in step S11 (step S12).

If no current is flowing through the FET 3i, no current is flowing through the load Ei, and thus the source voltage of the FET 3i is 0 V. Here, 0 V does not only mean 0 V in a strict sense. There is no problem as long as 0 V is substantially realized. If a current is flowing through the FET 3i, a current flows through the load Ei, and a voltage drop occurs at the load Ei. Thus, the source voltage of the FET 3i is higher than 0 V. Accordingly, the control unit 43 can determine whether or not a current is flowing through the FET 3i based on the source voltage of the FET 3i.

In step S12, the control unit 43 determines that no current is flowing through the FET 3i if the source voltage indicated by the voltage information acquired in step S11 is substantially 0 V. The control unit 43 determines that a current is flowing through the FET 3i if the source voltage indicated by the voltage information acquired in step S11 is higher than 0 V. At the point in time when step S11 is executed, an instruction to switch the FET 3i off has been provided. Thus, a state in which a current is flowing through the FET 3i at the point in time when step S11 is executed indicates the occurrence of an ON failure in the FET 3i.

Upon determining that a current is flowing through the FET 3i (YES in step S12), the control unit 43 instructs the switching unit 40 to switch the connection destination of the fuse element Fi to the FETs 3i and 3j (step S13). In step S13, the switching unit 40 switches on the transistor Tj of the connection circuit 2 (see FIG. 2). Thus, the connection destination of the fuse element Fi switches to the FETs 3i and 3j. As described above, if the natural number i is 1, the natural number j is 2. If the natural number i is 2, the natural number j is 1.

Step S13 is executed regardless of the state of the FET 3j. If step S13 is executed while the FET 3j is on, a current flows through the fuse element Fi and the FET 3i in this order and also flows through the fuse element Fi and the FET 3j in this order. Thus, the current flowing through the fuse element Fi becomes greater than or equal to the reference current. The reference current of the fuse element Fi is greater than a current that flows through the FET $3i$ when the FET $3i$ is on, and is no greater than the total value of currents that flow through the FETs $3i$ and $3j$ when the FETs $3i$ and $3j$ are on.

After executing step S13, the control unit 43 determines whether or not the FET $3j$ is off (step S14). If the FET $3j$ is not off, the FET $3j$ is on. Upon determining that the FET $3j$ is off (YES in step S14), the control unit 43 instructs the output unit Gj to switch the FET $3j$ on (step S15).

Thus, the output unit Gj switches the voltage output to the driving circuit Dj from the low-level voltage to the high-level voltage, and the driving circuit Dj switches the FET $3j$ on. Consequently, a current flows through the fuse element Fi and the FET $3i$ in this order and also flows through the fuse element Fi and the FET $3j$ in this order, and the current flowing through the fuse element Fi becomes greater than or equal to the reference current. The load Ej activates as a result of the FET $3j$ switching on. Thus, the occupants of the vehicle are notified of the occurrence of an ON failure.

Upon determining that the FET $3j$ is not off (NO in step S14) or after executing step S15, the control unit 43 acquires voltage information from the A/D conversion unit Mi (step S16). The control unit 43 determines whether or not the fuse element Fi has been blown based on the source voltage of the FET $3i$ indicated by the voltage information acquired in step S16 (step S17).

If the fuse element Fi has been blown, no current flows through the FET $3i$ and the load Ei, and thus the source voltage of the FET $3i$ is 0 V. Here, 0 V does not only mean 0 V in a strict sense, and there is no problem as long as 0 V is substantially realized. If the fuse element Fi has not been blown, a current flows through the FET $3i$ and the load Ei, and a voltage drop occurs at the load Ei. Thus, the source voltage of the FET $3i$ is higher than 0 V.

Accordingly, the control unit 43 can determine whether or not the fuse element Fi has been blown based on the source voltage of the FET $3i$. Specifically, in step S17, the control unit 43 determines that the fuse element Fi has been blown if the source voltage of the FET $3i$ indicated by the voltage information acquired in step S16 is substantially 0 V. The control unit 43 determines that the fuse element Fi has not been blown if the source voltage of the FET $3i$ indicated by the voltage information acquired in step S16 is higher than 0 V.

Note that, in step S17, the connection destination of the fuse element Fi is the FETs $3i$ and $3j$. Due to this, if the fuse element Fi has been blown, no current flows through the FET $3j$ and the load Ej, and thus the source voltage of the FET $3j$ is substantially 0 V. If the fuse element Fi has not been blown, a current flows through the FET $3j$ and the load Ej, and a voltage drop occurs at the load Ej. Thus, the source voltage of the FET $3j$ is higher than 0 V. Accordingly, the control unit 43 can determine whether or not the fuse element Fi has been blown based on the source voltage of the FET $3j$.

Based on the above, the control unit 43 may acquire voltage information from the A/D conversion unit Mj in step S16. In this case, in step S17, the control unit 43 determines whether or not the fuse element Fi has been blown based on the source voltage of the FET $3j$ indicated by the voltage information acquired in step S16. The determination method here is the same as that of the determination performed based on the source voltage of the FET $3i$.

Upon determining that the fuse element Fi has not been blown (NO in step S17), the control unit 43 executes step S16 again and waits until the fuse element Fi is blown. Upon determining that the fuse element Fi has been blown (YES in step S17), the control unit 43 determines whether or not the FET $3j$ was on at the point in time when step S13 was executed (step S18). If the FET $3j$ was not on, the FET $3j$ was off.

Upon determining that the FET $3j$ was not on (NO in step S18), the control unit 43 instructs the output unit Gj to switch the FET $3j$ off (step S19). Thus, the output unit Gj switches the voltage output to the driving circuit Dj from the high-level voltage to the low-level voltage, and the driving circuit Dj switches the FET $3j$ off. Upon determining that the FET $3j$ was on (YES in step S18) or after executing step S19, the control unit 43 instructs the switching unit 40 to switch the connection destination of the fuse element Fj to the FET $3j$ (step S20). The switching unit 40 switches the connection destination of the fuse element Fj to the FET $3j$ by switching off the transistor Tj of the connection circuit 2.

Upon determining that no current is flowing through the FET $3i$ (NO in step S12) or after executing step S20, the control unit 43 terminates the blowing process of the fuse element Fi and terminates the power-supply control process for the load Ei.

Effect of Power-Supply Control Device 10

If a current is flowing through the FET $3i$ even though the control unit 43 has instructed the output unit Gi to switch the FET $3i$ off, the switching unit 40 connects the FETs $3i$ and $3j$ to the fuse element Fi, and the FET $3j$ is switched on. Accordingly, the current flowing through the fuse element Fi increases and becomes greater than or equal to the reference current, and the fuse element Fi is blown. After the fuse element Fi has been blown, the switching unit 40 returns the connection destination of the fuse element Fj to the FET $3j$. Thus, power can be supplied to the load Ej via the fuse element Fj and the FET $3j$ once again.

Embodiment 2

In embodiment 1, the power-supply control device 10 includes two FETs. However, the power-supply control device 10 may include three or more FETs.

In the following, the differences of embodiment 2 from embodiment 1 will be described. Configurations in embodiment 2 other than those described in the following are similar to those in embodiment 1. Thus, the same reference symbols are given to components similar to those in embodiment 1 and description thereof will be omitted.

Configuration of Power System 1

Figure 6:
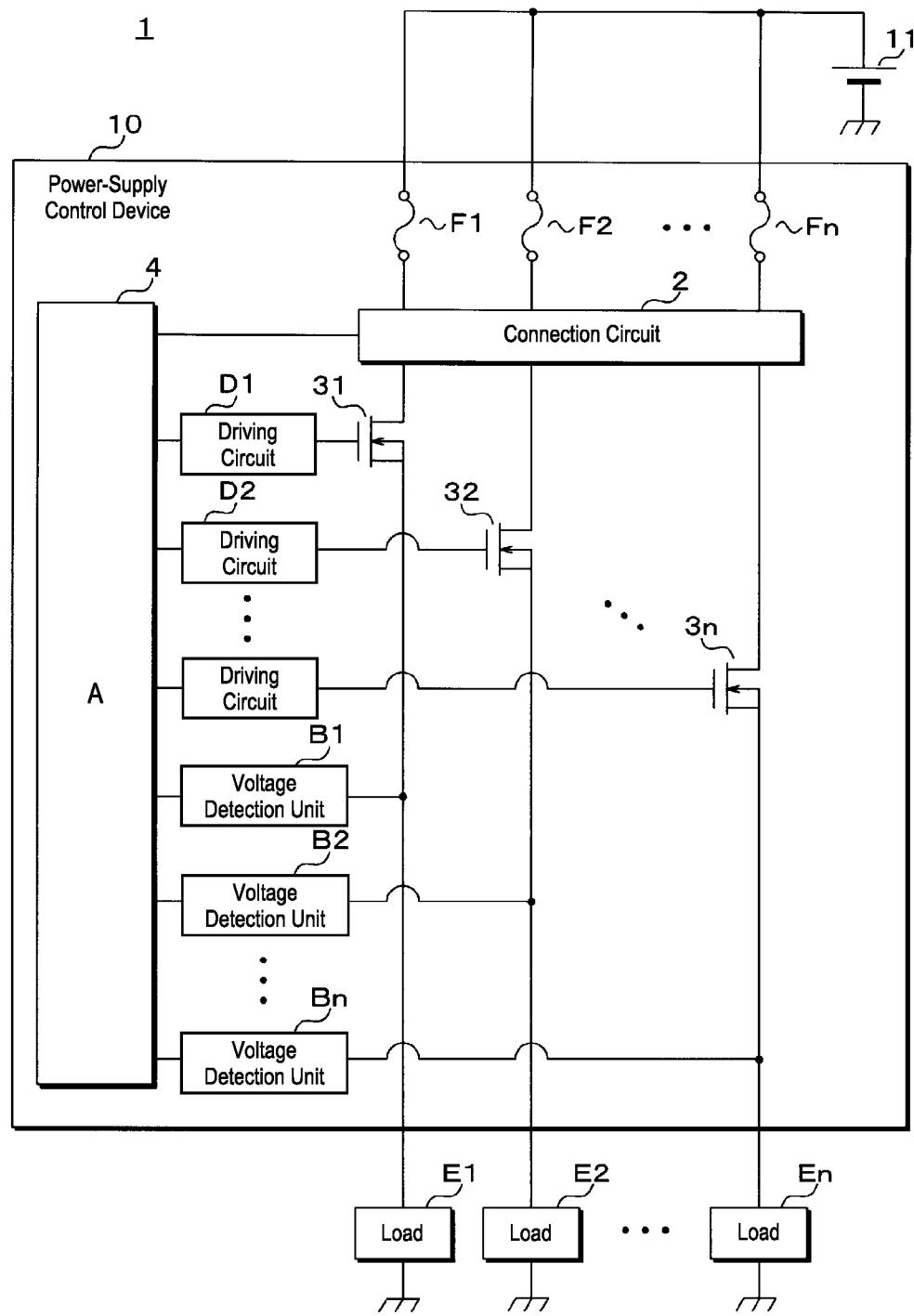
FIG. 6 is a block diagram illustrating a configuration of a main part of a power system in embodiment 2.

FIG. 6 is a block diagram illustrating a configuration of a main part of a power system 1 in embodiment 2. The power system 1 includes n loads E1, E2, . . . , En instead of two loads E1 and E2. Here, n is an integer of 3 or more. In embodiment 2, the natural number k represents a natural number that is n or less. The natural number k may be any one of 1, 2, . . . , n.

The power-supply control device 10 is connected to one end of the load Ek. The other end of the load Ek is grounded. As is the case in embodiment 1, the load Ek is an electric device. The load Ek operates if power is supplied thereto. The load Ek stops operating if power supply thereto stops.

In embodiment 2, operation signals indicate a load to be operated among the loads E1, E2, . . . , En. Stop signals indicate a load whose operation is to be stopped among the loads E1, E2, . . . , En. Upon input of an operation signal indicating the load Ek, the power-supply control device 10 electrically connects the DC power source 11 and the load Ek. Thus, the DC power source 11 supplies power to the load Ek, and the load Ek operates. Upon input of a stop signal indicating the load Ek, the power-supply control device 10 electrically disconnects the DC power source 11 and the load Ek. Thus, power supply to the load Ek stops, and the load Ek stops operating.

The power-supply control device 10 controls power supply to the loads E1, E2, . . . , En in such a manner.

Configuration of Power-Supply Control Device 10

When the power-supply control device 10 in embodiment 2 is compared with the power-supply control device 10 in embodiment 1, there is a difference in the number of FETs, voltage detection units, and driving circuits included in the power supply control device 10. In embodiment 2, the power-supply control device 10 includes n N-channel FETs 31, 32, . . . , 3n instead of two N-channel FETs 31 and 32. The power-supply control device 10 includes n voltage detection units B1, B2, . . . , Bn instead of two voltage detection units B1 and B2. The power-supply control device 10 includes n driving circuits D1, D2, . . . , Dn instead of two driving circuits D1 and D2. The power-supply control device 10 includes n fuse elements F1, F2, . . . , Fn instead of two fuse elements F1 and F2.

The FET 3k, the voltage detection unit Bk, the driving circuit Dk, and the fuse element Fk are each connected in the same way as they are in embodiment 1.

The connection circuit 2 connects the fuse element Fk to at least one of the n FETs 31, 32, . . . , 3n. Normally, the connection circuit 2 connects the fuse elements F1, F2, . . . , Fn to the FETs 31, 32, . . . , 3n, respectively. The connection destination of the fuse element Fk is switched by the microcomputer 4. Switching the connection destination of the fuse element Fk is equivalent to switching the connection destination of the FET 3k.

The microcomputer 4 outputs a high-level voltage or a low-level voltage to the driving circuit Dk. The FET 3k, the fuse element Fk, the driving circuit Dk, and the fuse element Bk function in the same way as they do in embodiment 1. The driving circuit Dk switches the FET 3k on or off in accordance with a voltage that is input from the microcomputer 4.

As is the case in embodiment 1, upon switching the voltage output to the driving circuit Dk from the high-level voltage to the low-level voltage in a state in which the connection destination of the fuse element Fk is the FET 3k, the microcomputer 4 determines whether or not an ON failure has occurred in the FET 3k.

Upon determining that an ON failure has occurred in the FET 3k, the microcomputer 4 switches the connection destination of the fuse element Fk from the FET 3k to the FET 3k and an off-FET that is an FET that is off among the (n−1) FETs other than the FET 3k. After switching the connection destination of the fuse element Fk to the FET 3k and the off-FET, the microcomputer 4 instructs a driving circuit to switch the off-FET on. Thus, the current flowing through the fuse element Fk becomes greater than or equal to the reference current, and the fuse element Fk is blown.

The microcomputer 4 determines whether or not the fuse element Fk has been blown based on the source voltage indicated by the voltage information input from the voltage detection unit Bk. Upon determining that the fuse element Fk has been blown, the microcomputer 4 instructs the driving circuit to switch the off-FET off. Furthermore, the microcomputer 4 returns the connection destination of the off-FET to the previously-connected fuse element.

Configuration of Microcomputer 4

Figure 7:
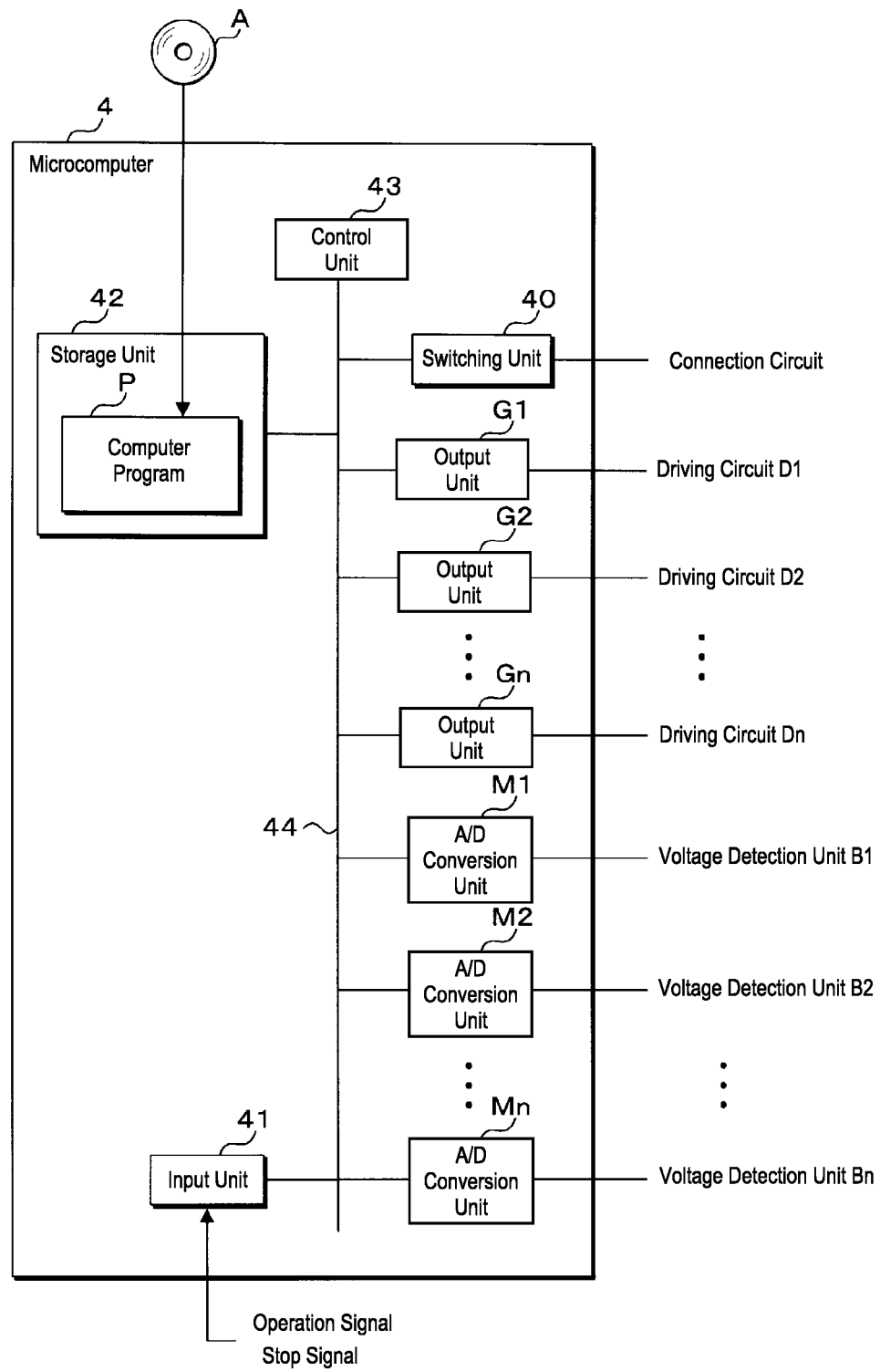
FIG. 7 is a block diagram illustrating a configuration of a main part of a microcomputer.

FIG. 7 is a block diagram illustrating a configuration of a main part of a microcomputer 4. When the microcomputer 4 in embodiment 2 is compared with the microcomputer 4 in embodiment 1, there is a difference in the number of output units and A/D conversion units. In embodiment 2, the microcomputer 4 includes n output units G1, G2, . . . , Gn instead of two output units G1 and G2. The microcomputer 4 includes n A/D conversion units M1, M2, . . . , Mn instead of two A/D conversion units M1 and M2.

The switching unit 40 is connected to the connection circuit 2. The output unit Gk and the A/D conversion unit Mk are each connected in the same way as they are in embodiment 1.

The connection circuit 2 includes a plurality of unillustrated switches. The switching unit 40 switches the connection destination of the downstream-side end of the fuse element Fk by separately switching on or off the plurality of switches included in the connection circuit 2.

The control unit 43 instructs the switching unit 40 to switch the connection destination of the fuse element Fk to the FET 3k and the off-FET. Furthermore, the control unit 43 instructs the switching unit 40 to switch the connection destination of the fuse element Fk to the FET 3k. By following the instructions from the control unit 43, the switching unit 40 separately switches on or off the plurality of switches included in the connection circuit 2.

The output unit Gk and the A/D conversion unit Mk each function in the same way as they do in embodiment 1.

By executing the computer program P, the processing element of the control unit 43 parallelly executes n power-supply control processes for controlling power supply to the loads E1, E2, . . . , En, respectively, etc. In the power-supply control process for the load Ek, a blowing process of the fuse element Fk is executed.

Power-Supply Control Process for Load Ei

In embodiment 2, the natural number i represents a natural number that is n or less. The natural number i may be any one of 1, 2, . . . , n. As described above, n is an integer of 3 or more. In a state in which the fuse elements F1, F2, . . . , Fn are respectively connected to the FETs 31, 32, . . . , 3n, the control unit 43 executes the power-supply control process for the load Ei in a similar manner as in embodiment 1.

Blowing Process of Fuse Element Fi

Figure 8:
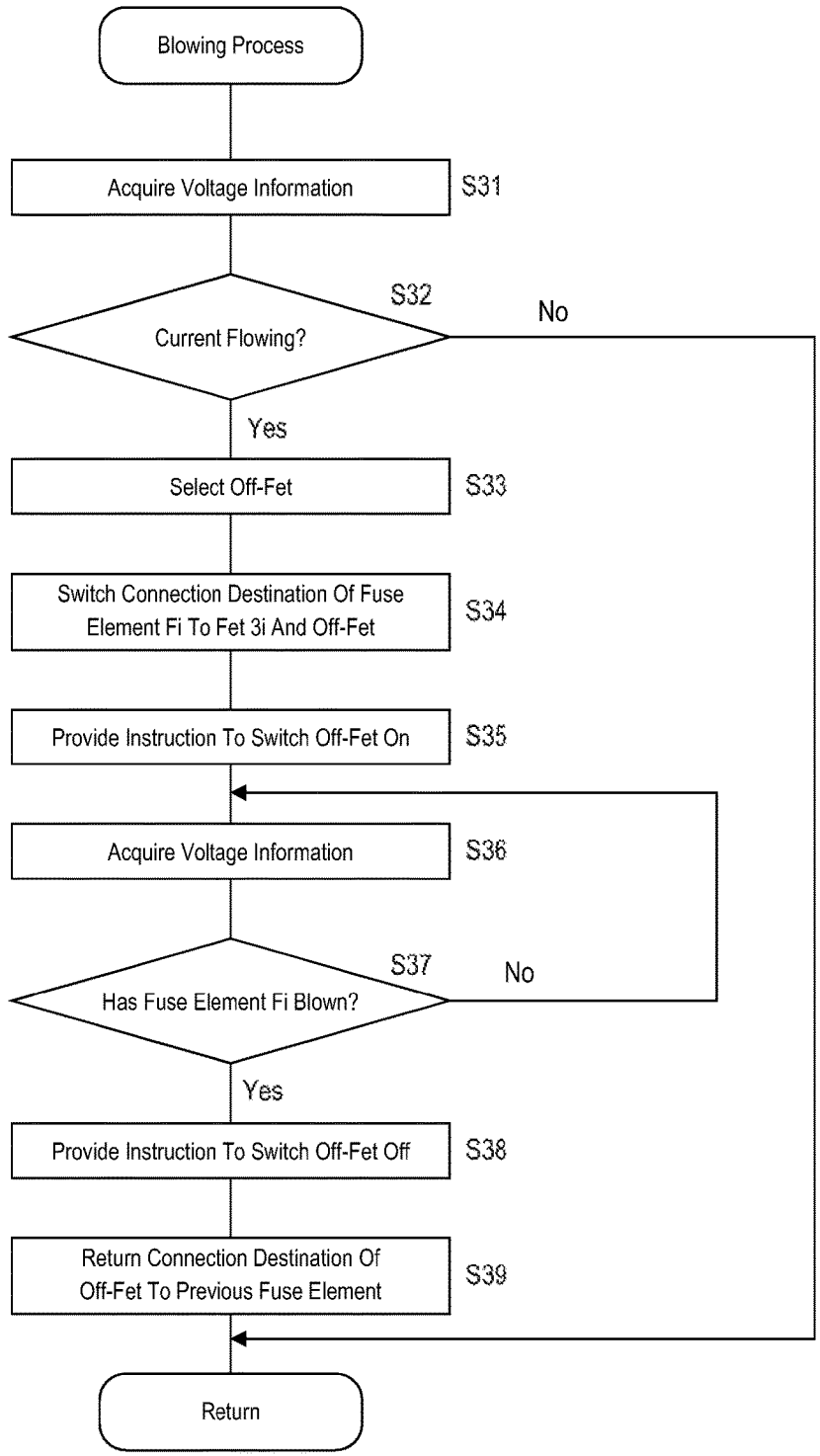
FIG. 8 is a flowchart illustrating procedures of a fuse-element blowing process.

FIG. 8 is a flowchart illustrating procedures of a blowing process of the fuse element Fi. The control unit 43 executes the blowing process of the fuse element Fi in a state in which the fuse elements F1, F2, . . . , Fn are respectively connected to the FETs 31, 32, . . . , 3n, and an instruction to switch the FET 3i off has been provided.

In embodiment 2, the FET 3i functions as the first FET as is the case in embodiment 1. Among the n FETs 31, 32, . . . , 3n, the (n−1) FETs other than the FET 3i each function as the second FET. Because n is an integer of 3 or more as described above, two or more second FETs are provided. The load Ei functions as the first load as is the case in embodiment 1. Among the n loads E1, E2, . . . , En, the (n−1) loads other than the load Ei each function as the second load. Among the n fuse elements F1, F2, . . . , Fn, the (n-1) fuse elements other than the fuse element Fi each function as the second fuse element. The reference current of the fuse element Fi corresponds to the predetermined current as is the case in embodiment 1. The reference current of each of the (n−1) fuse elements other than the fuse element Fi corresponds to the second predetermined current.

In the blowing process of the fuse element Fi, the control unit 43 first acquires voltage information from the A/D conversion unit Mi (step S31), and, based on the source voltage of the FET 3i indicated by the acquired voltage information, determines whether or not a current is flowing through the FET 3i (step S32), similarly to step S12 in the blowing process in embodiment 1. A state in which a current is flowing through the FET $3i$ at the point in time when the execution of step S31 is complete indicates the occurrence of an ON failure in the FET $3i$.

Upon determining that a current is flowing through the FET $3i$ (YES in step S32), the control unit 43 selects an off-FET that is an FET that is off among the (n−1) FETs other than the FET $3i$ (step S33). In step S33, the control unit 43 does not need to select all of the off-FETs, which are FETs that are off among the (n−1) FETs other than the FET $3i$. In step S33, there is no problem as long as the control unit 43 selects at least one off-FET. In the following, an example will be described in which one off-FET is selected by the control unit 43.

Next, the control unit 43 instructs the switching unit 40 to switch the connection destination of the fuse element Fi to the FET $3i$ and the off-FET selected in step S33 (step S34). After causing step S34 to be executed, the control unit 43 instructs an output unit to switch on the off-FET selected in step S33 (step S35). Accordingly, the output unit switches the voltage output to a driving circuit to the high-level voltage, and the driving circuit switches the off-FET on. Thus, the current flowing through the fuse element Fi becomes greater than or equal to the reference current. The reference current of the fuse element Fi is greater than a current that flows through the FET $3i$ when the FET $3i$ is on, and is no greater than the total value of currents that flow through the FET $3i$ and the off-FET when the FET $3i$ and the off-FET are on.

The output unit and the driving circuit mentioned here are those corresponding to the off-FET selected in step S33. For example, if the off-FET selected in step S33 is the FET $3u$, the control unit 43 instructs the output unit Gu to switch the FET $3u$ on in step S35. The driving circuit Du switches the FET $3u$ on. Here, u is a natural number that is n or less and that is different from the natural number i. The load Eu activates when the FET $3u$ switches on. Consequently, the occupants of the vehicle are notified of the occurrence of an ON failure.

After executing step S35, the control unit 43 acquires voltage information from the A/D conversion unit Mi (step S36). The control unit 43 determines whether or not the fuse element Fi has been blown based on the source voltage of the FET $3i$ indicated by the voltage information acquired in step S36 (step S37), similarly to step S17 in the blowing process in embodiment 1.

Note that, in step S37, the connection destination of the fuse element Fi is the FET $3i$ and the off-FET. Thus, the control unit 43 can determine whether or not the fuse element Fi has been blown based on the source voltage of the off-FET. Based on the above, the control unit 43 may acquire voltage information from the A/D conversion unit corresponding to the off-FET in step S36. In this case, in step S37, the control unit 43 determines whether or not the fuse element Fi has been blown based on the source voltage of the off-FET indicated by the voltage information acquired in step S36.

Upon determining that the fuse element Fi has not been blown (NO in step S37), the control unit 43 executes step S36 again and waits until the fuse element Fi is blown. Upon determining that the fuse element Fi has been blown (YES in step S37), the control unit 43 instructs an output unit to switch off the off-FET selected in step S33 (step S38). Accordingly, the output unit switches the voltage output to a driving circuit to the low-level voltage, and the driving circuit switches the off-FET off. The output unit and the driving circuit mentioned here are those corresponding to the off-FET selected in step S33.

After executing step S38, the control unit 43 instructs the switching unit 40 to switch the connection destination of the off-FET selected in step S33 to the previously-connected fuse element (step S39). If the off-FET selected in step S33 is the FET $3u$, the control unit 43 instructs the switching unit 40 to switch the connection destination of the fuse element Fu to the FET $3u$ in step S39. As described above, u is a natural number that is n or less and that is different from the natural number i.

Upon determining that no current is flowing through the FET $3i$ (NO in step S32) or after executing step S39, the control unit 43 terminates the blowing process of the fuse element Fi and terminates the power-supply control process for the load Ei.

Note that, in step S33, if the (n−1) FETs other than the FET $3i$ are on, one of the (n−1) FETs other than the FET $3i$ is selected. In this case, in step S34, the control unit 43 instructs the switching unit 40 to switch the connection destination of the fuse element Fi to the FET $3i$ and the FET selected in step S33. The control unit 43 skips the execution of steps S35 and S38.

Effect of Power-Supply Control Device 10

In a case in which the fuse element Fi is to be blown, an off-FET, which is an FET that is off among the (n−1) FETs other than the FET $3i$, is connected to the fuse element and switched on. Accordingly, unless all FETs other than the FET $3i$ are on at the point in time when it is determined that a current is flowing through the FET $3i$, power supply to operating loads is not interrupted.

The power-supply control device 10 in embodiment 2 similarly achieves the effects that are achieved by the power-supply control device 10 in embodiment 1.

Modifications

In embodiments 1 and 2, in regard to an FET in which an ON failure has occurred, a current that flows through the FET when an instruction to switch the FET on is provided may be greater than a current that flows through the FET when an instruction to switch the FET off is provided. Due to this, in the blowing process in embodiments 1 and 2, upon determining that a current is flowing through the FET $3i$ even though the output unit Gi has been instructed to switch the FET $3i$ off, the control unit 43 may instruct the output unit Gi to switch the FET $3i$ on. Thus, the fuse element Fi can be blown reliably.

In embodiments 1 and 2, the method for determining whether or not a current is flowing through the FET $3i$ is not limited to that in which the determination is performed based on the source voltage of the FET $3i$. The control unit 43 may determine whether or not a current is flowing through the FET $3i$ based on a current flowing through the drain and the source of the FET $3i$. The control unit 43 determines that no current is flowing through the FET $3i$ if the current flowing through the drain and the source of the FET $3i$ is substantially 0 A. The control unit 43 determines that a current is flowing through the FET $3i$ if the current flowing through the drain and the source of the FET $3i$ is greater than 0 A.

In embodiments 1 and 2, the method for determining whether or not the fuse element Fi has been blown is not limited to that in which the determination is performed based on the source voltage of an FET connected to the fuse element Fi. The control unit 43 may determine whether or not the fuse element Fi has been blown based on a current flowing through the drain and the source of an FET connected to the fuse element Fi. The control unit 43 determines that the fuse element Fi has been blown if the current flowing through the drain and the source of the FET is substantially 0 A. The control unit 43 determines that the fuse element Fi has not been blown if the current flowing through the drain and the source of the FET is higher than 0 A.

In embodiments 1 and 2, the timing when the control unit 43 executes the blowing process is not limited to the timing when the FET 3*i* switches off in the power-supply control process. For example, the blowing process may be executed immediately after the ignition switch of the vehicle is switched on, or immediately before the ignition switch is switched off. In embodiments 1 and 2, there is no problem as long as the FET 3*k* functions as a semiconductor switch. Thus, a P-channel FET or a bipolar transistor may be used in place of the FET 3*k*.

Embodiments 1 and 2 disclosed herein are examples in every way, and shall be construed as being non-limiting. The scope of the present disclosure is not limited to what is defined above, but defined by the claims, and is intended to include all modifications within the meaning and scope of equivalents of the claims.

The invention claimed is:

1. A power-supply control device that controls power supply by separately switching on or off a first FET and a second FET that are respectively connected to a first load and a second load, the power-supply control device comprising:
   a fuse element that is blown if a current that is greater than or equal to a predetermined current flows therethrough;
   a switching unit that switches the connection destination of a downstream-side end of the fuse element; and
   a processing unit that executes processing,
   wherein the processing unit:
      in a state in which the connection destination of the fuse element is the first FET, provides an instruction to switch the first FET off;
      after providing the instruction to switch the first FET off, determines whether or not a current is flowing through the first FET;
      upon determining that a current is flowing through the first FET, instructs the switching unit to switch the connection destination of the fuse element to the first and second FETs; and
      provides an instruction to switch the second FET on.

2. The power supply control device according to claim 1, further comprising:
   a second fuse element that is blown if a current that is greater than or equal to a second predetermined current flows therethrough,
   wherein the switching unit separately switches the connection destinations of downstream-side ends of the fuse element and the second fuse element, and
   the processing unit provides the instruction to switch the first FET off in a state in which the connection destinations of the fuse element and the second fuse element are the first FET and the second FET, respectively.

3. The power supply control device according to claim 2, wherein the processing unit:
   after instructing the switching unit to switch the connection destination of the fuse element to the first and second FETs, determines whether or not the fuse element has been blown; and
   upon determining that the fuse element has been blown, instructs the switching unit to switch the connection destination of the second fuse element to the second FET.

4. The power supply control device according to claim 3, wherein the first load is arranged downstream of the first FET in a first current path of a current that flows through the first FET,
   the second load is arranged downstream of the second FET in a second current path of a current that flows through the second FET, and
   after instructing the switching unit to switch the connection destination of the fuse element to the first and second FETs, the processing unit determines whether or not the fuse element has been blown based on a voltage of a downstream-side end of the first FET or the second FET.

5. The power supply control device according to claim 4, wherein the first load is arranged downstream of the first FET in a current path of a current that flows through the first FET, and
   after providing the instruction to switch the first FET off, the processing unit determines whether or not a current is flowing through the first FET based on a voltage of a downstream-side end of the first FET.

6. The power supply control device according to claim 4, wherein two or more second FETs are provided, and
   the processing unit:
      upon determining that a current is flowing through the first FET, instructs the switching unit to switch the connection destination of the fuse element to the first FET and an off-FET that is a second FET that is off among the plurality of second FETs; and
      provides an instruction to switch on the off-FET connected to the fuse element.

7. The power supply control device according to claim 3, wherein the first load is arranged downstream of the first FET in a current path of a current that flows through the first FET, and
   after providing the instruction to switch the first FET off, the processing unit determines whether or not a current is flowing through the first FET based on a voltage of a downstream-side end of the first FET.

8. The power supply control device according to claim 3, wherein two or more second FETs are provided, and
   the processing unit:
      upon determining that a current is flowing through the first FET, instructs the switching unit to switch the connection destination of the fuse element to the first FET and an off-FET that is a second FET that is off among the plurality of second FETs; and
      provides an instruction to switch on the off-FET connected to the fuse element.

9. The power supply control device according to claim 2, wherein the first load is arranged downstream of the first FET in a current path of a current that flows through the first FET, and
   after providing the instruction to switch the first FET off, the processing unit determines whether or not a current is flowing through the first FET based on a voltage of a downstream-side end of the first FET.

10. The power supply control device according to claim 2, wherein two or more second FETs are provided, and
    the processing unit:
       upon determining that a current is flowing through the first FET, instructs the switching unit to switch the connection destination of the fuse element to the first FET and an off-FET that is a second FET that is off among the plurality of second FETs; and
       provides an instruction to switch on the off-FET connected to the fuse element.

11. The power supply control device according to claim 1, wherein the first load is arranged downstream of the first FET in a current path of a current that flows through the first FET, and after providing the instruction to switch the first FET off, the processing unit determines whether or not a current is flowing through the first FET based on a voltage of a downstream-side end of the first FET.

12. The power supply control device according to claim 11, wherein two or more second FETs are provided, and the processing unit:

upon determining that a current is flowing through the first FET, instructs the switching unit to switch the connection destination of the fuse element to the first FET and an off-FET that is a second FET that is off among the plurality of second FETs; and provides an instruction to switch on the off-FET connected to the fuse element.

13. The power supply control device according to claim 1, wherein two or more second FETs are provided, and the processing unit:

upon determining that a current is flowing through the first FET, instructs the switching unit to switch the connection destination of the fuse element to the first FET and an off-FET that is a second FET that is off among the plurality of second FETs; and provides an instruction to switch on the off-FET connected to the fuse element.

14. A blowing method in which a computer executes:

a step of, in a state in which the connection destination of a downstream-side end of a fuse element that is blown if a current that is greater than or equal to a predetermined current flows therethrough is a first FET that is connected to a first load, providing an instruction to switch the first FET off;

a step of, after providing the instruction to switch the first FET off, determining whether or not a current is flowing through the first FET;

a step of, upon determining that a current is flowing through the first FET, instructing a switching unit that switches the connection destination of the downstream-side end of the fuse element to switch the connection destination of the fuse element to the first FET and a second FET that is connected to a second load; and a step of providing an instruction to switch the second FET on.

15. A computer program for causing a computer to execute:

a step of, in a state in which the connection destination of a downstream-side end of a fuse element that is blown if a current that is greater than or equal to a predetermined current flows therethrough is a first FET that is connected to a first load, providing an instruction to switch the first FET off;

a step of, after providing the instruction to switch the first FET off, determining whether or not a current is flowing through the first FET;

a step of, upon determining that a current is flowing through the first FET, instructing a switching unit that switches the connection destination of the downstream-side end of the fuse element to switch the connection destination of the fuse element to the first FET and a second FET that is connected to a second load; and a step of providing an instruction to switch the second FET on.

* * * * *